Dec. 29, 1925.                                               1,567,922
T. L. DE SPAIN
LOCKING ATTACHMENT OR BRAKE FOR TRUCKS
Filed Dec. 4, 1924
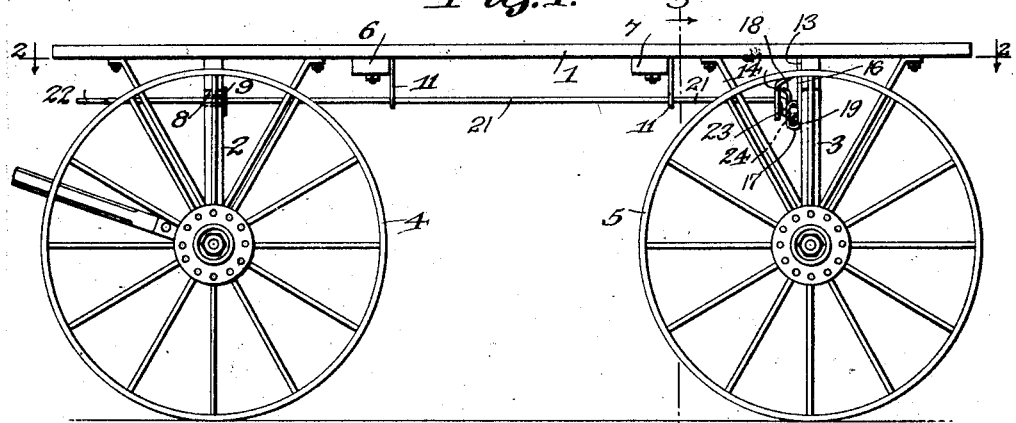
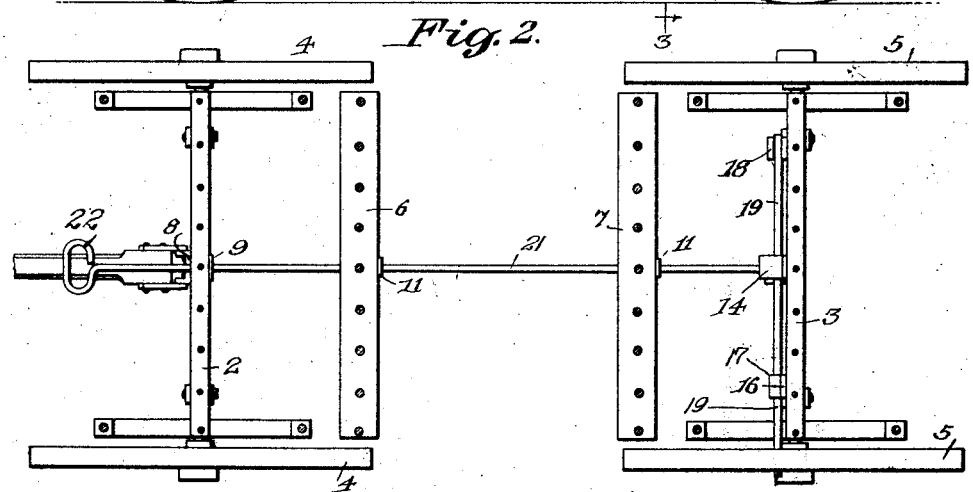
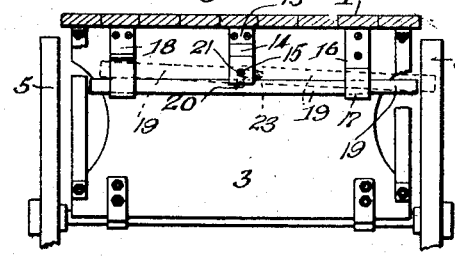
T. L. De Spain, INVENTOR.
BY Geo. F. Kimmel
ATTORNEY.

Patented Dec. 29, 1925.

1,567,922

UNITED STATES PATENT OFFICE.

THOMAS L. DE SPAIN, OF MORGAN, TEXAS, ASSIGNOR OF ONE-THIRD TO SIDNEY R. McMULLEN AND ONE-THIRD TO GROVER Y. REED, BOTH OF FORT WORTH, TEXAS.

LOCKING ATTACHMENT OR BRAKE FOR TRUCKS.

Application filed December 4, 1924. Serial No. 753,914.

*To all whom it may concern:*

Be it known that I, THOMAS L. DE SPAIN, a citizen of the United States, residing at Morgan, in the county of Bosque and State of Texas, have invented certain new and useful Improvements in Locking Attachments or Brakes for Trucks, of which the following is a specification.

This invention relates to a locking attachment or brake for trucks, and is designed primarily for use in connection with mail, express and baggage trucks, but it is to be understood that a locking attachment, in accordance with this invention, can be employed in connection with any style or size of truck or vehicle for which it is found applicable, and the invention has for its object to provide, in a manner as hereinafter set forth, a locking attachment to prevent the truck from moving from the position in which it may be left and so become liable to damage especially in the event of moving upon a railroad track and being hit by a passing train.

Further objects of the invention are to provide, in a manner as hereinafter set forth, a locking attachment or brake for a truck, which is simple in its construction and arrangement, strong, durable, compact, thoroughly efficient in its use, conveniently operated, readily installed with respect to the truck body, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—

Figure 1 is a side elevation of a four-wheel truck, showing the adaptation therewith of a locking attachment or brake, in accordance with this invention.

Figure 2 is a section on line 2—2, Figure 1.

Figure 3 is a section on line 3—3, Figure 1.

Figure 4 is a fragmentary view, in section, illustrating the locking member and the operating rod therefor.

Figure 5 is a perspective view of one of the rear hangers for the operating rod.

Figure 6 is a perspective view of the front hanger for the operating rod.

Figure 7 is a perspective view of the retaining member for the locking member.

Referring to the drawings in detail, 1 denotes the platform of a truck, 2 the front sill, 3 the rear sill, 4 the front wheels, and 5 the rear wheels. The lower face of the platform 1, between the front and rear wheels, has secured thereto a pair of spaced transversely extending brace members 6, 7.

The front sill 2 is formed with an opening 8, and secured to the rear face of the sill 2 is the front hanger 9, which is in the form of a polygonal-shaped plate and is provided with an opening 10, which registers with the opening 8. Secured to the rear edge of each of the brace members 6, 7, centrally thereof, as well as depending therefrom, is a rear hanger 11, which is rectangular in contour and provided at its lower end with an opening 12, which aligns with the opening 10 in the hanger 9.

Secured to the forward face of the rear sill 3, centrally thereof, is a hanger 13, which is offset forwardly, as at 14, and formed with an opening 15. Secured to the forward face of the sill 3, in proximity to one end thereof, is a retaining member 16, having a looped lower portion 17. Secured to the forward face of the sill 3, in proximity to the other end thereof, is a hook-shaped support 18, and mounted in the latter and extending through the loop 17 is a transversely shiftable locking member or bar 19, provided intermediate its ends with an opening 20.

Extending through the openings formed in the hangers 9 and 11, is an operating rod 21, which projects forwardly from the front sill 2 and has its forward end provided with a hand grip 22. The rod 21 extends through the opening 15 in the lower portion of the hanger 13. The rear end terminal portion of the rod 21 is angle-shaped in contour and consists of a vertical leg 23 and a longitudinally extending leg 24, which is positioned in the opening 20. The angle-shaped terminal portion of the rod 21 is provided for shifting the locking member 19 transversely with respect to the sill 4, to engage in a rear wheel for the purpose of locking the truck.

When the rod 21 is shifted in a counter-clockwise direction the locking member 19 will assume the position as shown in dotted lines in Figure 3, whereby one end of said member will extend through one of the rear wheels and lock the truck from movement. When the rod 21 is shifted in a clockwise direction the locking member 19 is moved from the position shown in Figures 2 and 3. The member 16 maintains the right-hand end of the locking member 19 in place at all times.

It is thought that the many advantages of a locking attachment or brake, in accordance with this invention, for trucks, can be readily understood, and although the preferred embodiment of the invention is as illustrated and described, yet changes in the details of construction can be had which will fall within the scope of the invention as claimed.

What I claim is:—

A locking attachment for the purpose set forth comprising a hanger having the lower portion thereof offset to project forwardly, a depending hook-shaped support arranged at one side of and spaced from said hanger, a depending retaining member arranged at the other side of and spaced from said support and having its lower portion formed of a closed loop of less height than the hooked portion of said support, a transversely disposed lengthwise shifting locking bar having one end mounted and vertically movable in the hooked portion of the support and its other end permanently extending through the loop of the retaining member, said bar arranged rearwardly of said hanger, an operating rod extending through said hanger and having an angle-shaped rear terminal portion engaging said bar for shifting the latter transversely to and from locking position within the support and loop when the rod is operated, and a plurality of spaced hangers arranged forwardly of the offset hanger for supporting said rod.

In testimony whereof, I affix my signature hereto.

THOMAS L. DE SPAIN.